(12) United States Patent
Laroche

(10) Patent No.: US 6,556,124 B1
(45) Date of Patent: Apr. 29, 2003

(54) KNOCKING ACTIVATED DEVICE AND METHOD FOR OPERATING AN ELECTROMECHANICAL DEVICE RESPONSIVE TO A CONTROL SIGNAL

(75) Inventor: André Laroche, Sherbrooke (CA)

(73) Assignee: 9068-7005 Quebec, Inc., Quebec (CA)

( * ) Notice: Subject to any disclaimer, the term of this patent is extended or adjusted under 35 U.S.C. 154(b) by 0 days.

(21) Appl. No.: 09/515,430

(22) Filed: Feb. 29, 2000

(30) Foreign Application Priority Data

Mar. 5, 1999 (CA) .............................................. 2262830

(51) Int. Cl.⁷ ................................................ H04Q 9/00
(52) U.S. Cl. ........................ 340/5.51; 340/5.1; 340/5.2; 340/870.11; 340/543; 340/825.64; 307/10.2
(58) Field of Search ....................... 340/5.1, 5.2, 5.51, 340/870.11, 543, 825.64; 307/10.2

(56) References Cited

U.S. PATENT DOCUMENTS

| | | | |
|---|---|---|---|
| 4,167,833 A | 9/1979 | Farina et al. ................. | 49/199 |
| 4,197,524 A * | 4/1980 | Salem ....................... | 340/5.51 |
| 4,205,325 A * | 5/1980 | Haygood et al. ....... | 340/870.11 |
| 4,499,462 A * | 2/1985 | Stoesser et al. ............ | 340/5.51 |
| 4,520,503 A | 5/1985 | Kirst et al. .................. | 381/56 |
| 4,781,231 A * | 11/1988 | Garcia et al. ............ | 224/42.11 |
| 5,001,466 A | 3/1991 | Orlinsky et al. ............ | 340/690 |
| 5,012,223 A | 4/1991 | Griebell et al. ............. | 340/531 |
| 5,072,973 A | 12/1991 | Gudgel et al. ................ | 292/55 |
| 5,410,227 A | 4/1995 | Toyozumi et al. .......... | 318/283 |
| 5,509,852 A | 4/1996 | Clark .......................... | 454/75 |
| 5,525,963 A | 6/1996 | Purssey ...................... | 340/540 |
| 5,532,521 A | 7/1996 | Leininger .................. | 307/10.2 |
| 5,563,483 A | 10/1996 | Kowall et al. .............. | 318/283 |
| 5,604,478 A | 2/1997 | Grady et al. ................. | 340/330 |
| 5,613,716 A | 3/1997 | Cafferty ...................... | 292/216 |
| 5,634,298 A | 6/1997 | Slopack ........................ | 49/360 |
| 5,638,047 A | 6/1997 | Orloff et al. ................. | 340/539 |
| 5,659,291 A | 8/1997 | Kennedy et al. ............ | 340/457 |
| 5,831,520 A | 11/1998 | Stephan ...................... | 340/457 |
| 6,191,682 B1 * | 2/2001 | Wolfgang ................... | 340/5.2 |

* cited by examiner

Primary Examiner—Michael Horabik
Assistant Examiner—Yves Dalencourt
(74) Attorney, Agent, or Firm—Merchant & Gould P.C.

(57) ABSTRACT

A knocking activated device and method for operating an electromechanical device responsive to a control signal. The knocking activated device has a vibration transducer for generating a signal in response to knockings on a solid object. It also has a storing system for storing data representative of a predetermined sequence of knocks. The device further comprises a user operable interface for changing the data stored in the storing system. The device also has a comparing system for comparing the signal generated by the vibration transducer with the data stored in the storing system to produce the control signal when the signal generated by the vibration transducer matches the predetermined sequence of knocks.

13 Claims, 3 Drawing Sheets

KNOCKING ACTIVATED DEVICE AND METHOD FOR OPERATING AN ELECTROMECHANICAL DEVICE RESPONSIVE TO A CONTROL SIGNAL

FIELD OF THE INVENTION

The present invention relates to a knocking activated device and a method for operating an electromechanical device, particularly a locking mechanism.

BACKGROUND

Known in the prior art, there is U.S. Pat. No. 4,167,833 (Farina et al.) which describes sound transmitter circuit for producing frequency coded sound waves and a receiver circuit which transforms the sound waves into electrical signals to permit a garage door to open or to close.

Also known in the art, there is U.S. Pat. No. 5,634,298 (Slopack) which describes an electromechanical door opening and closing device which can be voice or sound activated.

U.S. Pat. Nos. 5,438,312 (Lewis); 5,659,291 (Kennedy et al.); and 5,831,520 (Stephan) describe different systems for preventing car keys to be locked inside a vehicle.

The following U.S. Patents describe other systems for operating doors:

| | | | | |
|---|---|---|---|---|
| 4,520,503 | Kirst et al. | | 5,525,963 | Purssey |
| 5,001,466 | Orlinsky et al. | 30 | 5,532,521 | Leininger |
| 5,012,223 | Griebell et al. | | 5,563,483 | Kowall et al. |
| 5,072,973 | Gudgel et al. | | 5,604,478 | Grady et al. |
| 5,410,227 | Toyozumi et al. | | 5,613,716 | Cafferty |
| 5,509,852 | Clark | | 5,638,047 | Orloff et al. |

A drawback with all of the above mentioned patents is that no method or system is proposed for operating an electromechanical device by means of knockings in a simple and secure manner.

An object of the present is to provide a method or an apparatus for operating an electromechanical device in a simple and secure manner.

SUMMARY

According to the present invention, there is provided a knocking activated device for operating an electromechanical device responsive to a control signal. The knocking activated device comprises a vibration transducer for generating a signal in response to knockings on a solid object. It also comprises a storing system for storing data representative of a predetermined sequence of knocks. The device further comprises a user operable interface for changing the data stored in the storing means. The device also comprises a comparing system for comparing the signal generated by the vibration transducer with the data stored in the storing means to produce the control signal when the signal generated by the vibration transducer matches the predetermined sequence of knocks.

According to the present invention, there is also provided a method for operating an electromechanical device responsive to a control signal, comprising the steps of:

(a) storing data representative of a predetermined sequence of knocks through a user operable interface;

(b) once step (a) has been performed at least one time, generating a signal in response to knockings on a solid object; and (c) comparing the signal generated in step (b) with the data stored in step (a) to produce the control signal when the signal generated in step (b) matches the predetermined sequence of knocks.

BRIEF DESCRIPTION OF THE DRAWINGS

The invention as well as its numerous advantages will be better understood by the following non-restrictive description of possible embodiments made in reference to the appended drawings in which.

DETAILED DESCRIPTION OF THE INVENTION

Figure 1:
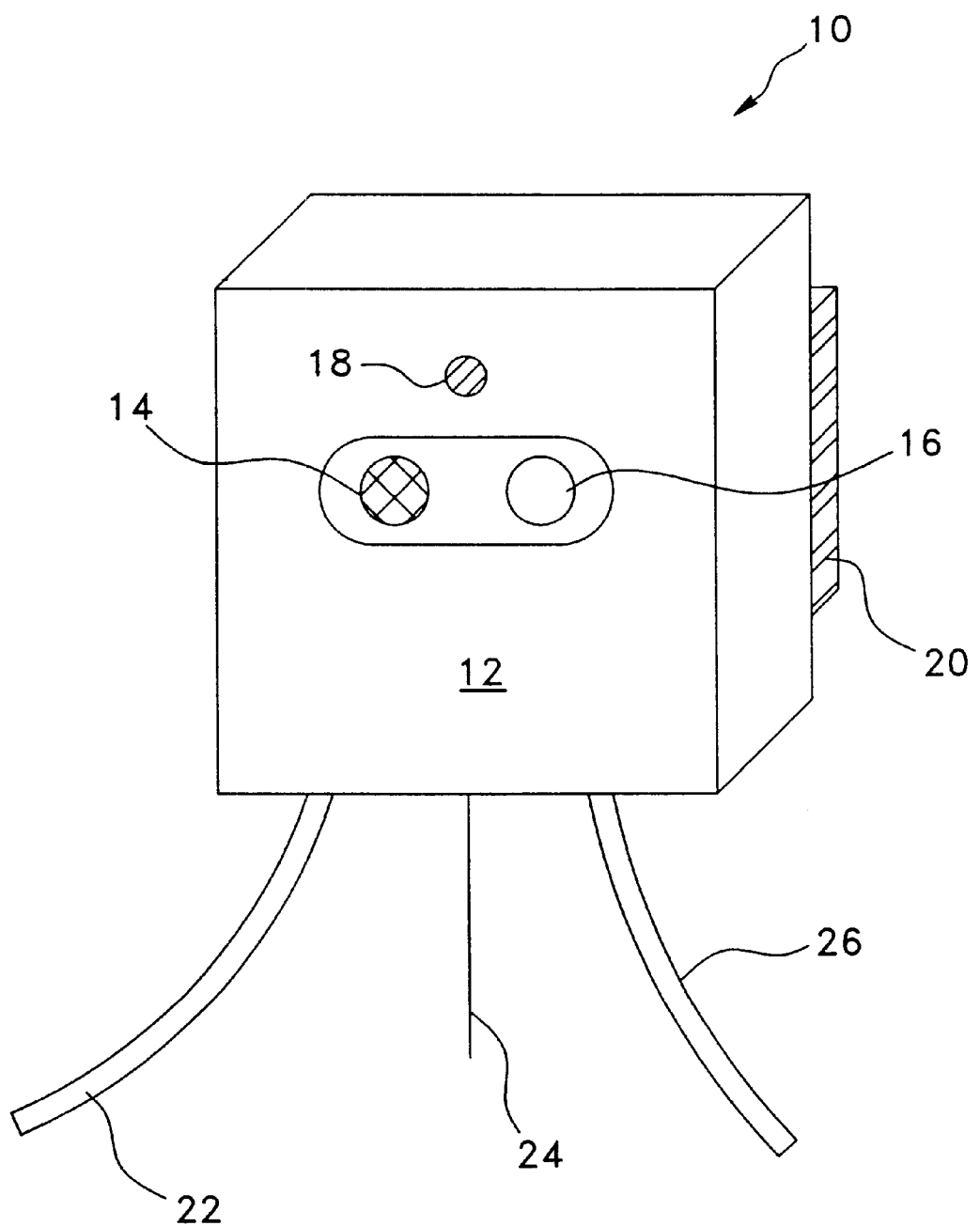
FIG. 1 is a perspective view of a knocking activated device according to a preferred embodiment of the present invention.
Figure 2:
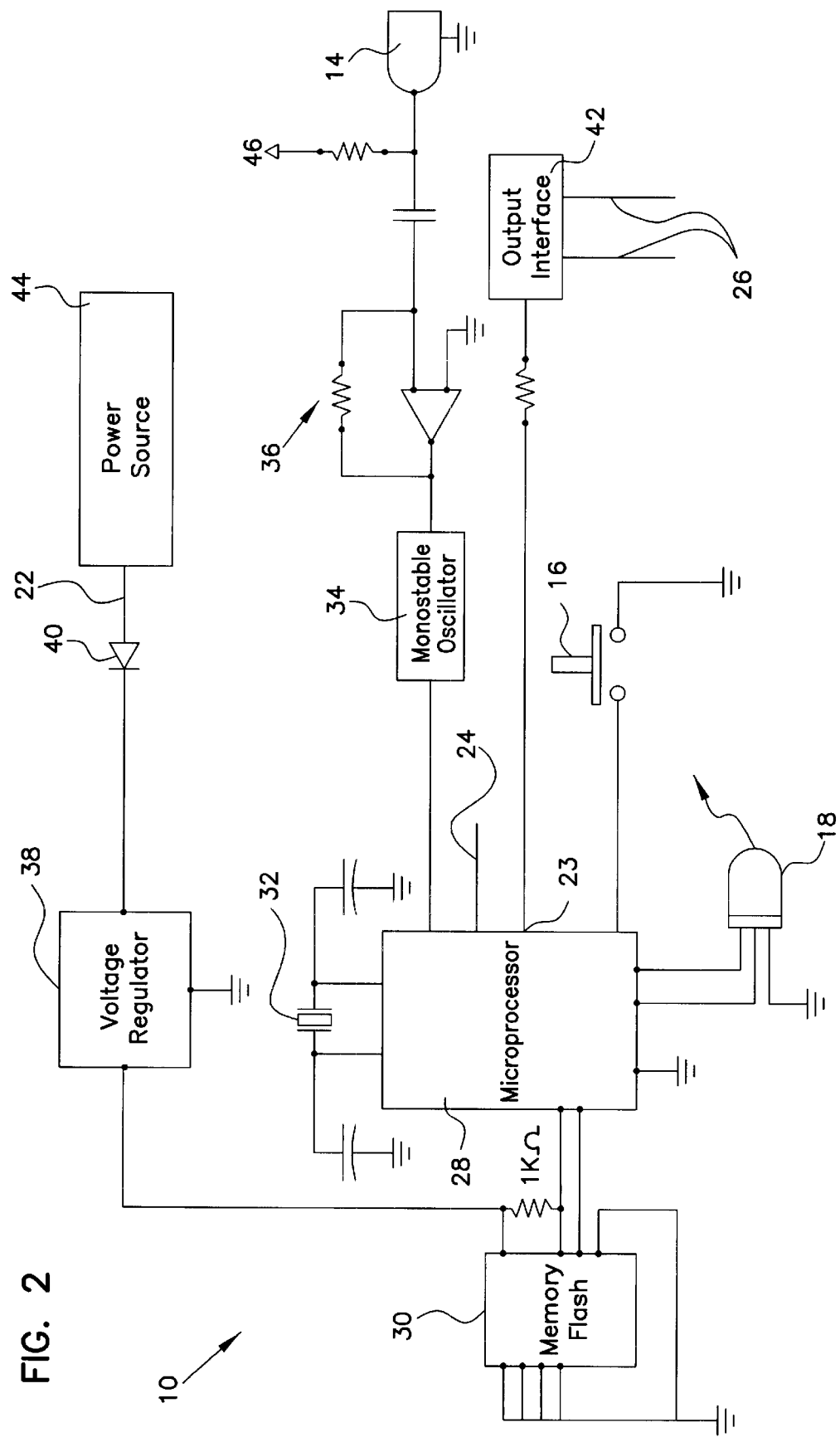
FIG. 2 shows a circuit diagram of the knocking activated device shown in FIG. 1.

Referring now to FIGS. 1 and 2, there is shown a knocking activated device 10 for operating an electromechanical device (not shown) responsive to a control signal. The knocking activated device 10 comprises a vibration transducer, which is preferably embodied by a microphone 14, for generating a signal in response to knockings on a solid object. The device 10 also comprises a storing system, which is preferably a memory flash 30, for storing data representative of a predetermined sequence of knocks. The device 10 further comprises a user operable interface, which preferably comprises a programming button 16 and a LED 18, for changing the data stored in the storing system. The device 10 also comprises a comparing system for comparing the signal generated by the microphone 14 with the data stored in the memory flash 30 to produce the control signal at output 23 when the signal generated by the microphone 14 matches the predetermined sequence of knocks.

Preferably, the comparing system comprises a discriminating system for discriminating the knockings detected by the microphone 14 into groups of knocks. Each group of knocks is separated by a time period of one second to ten seconds. The discriminating system is further adapted to recognize that knocks separated by less than one second belong to a same group of knocks.

Preferably, both the comparing system and the discriminating system are embodied by the microprocessor 28 provided with a software.

Preferably, the knocking activated device 10 further comprises a voltage regulator 38 having an input for connection to a power source 44 and an output for supplying the microprocessor 28 and the memory flash 30. The voltage regulator may be a 5 V voltage regulator and the power source may be a 12 V battery of a vehicle. A protection diode 40 is preferably used between the voltage regulator 38 and the 12 V battery in case a pair of cables 22 are inadvertently inverted upon connection by a user. The microphone 14, which is preferably an electret microphone, is powered by a 5 V power supply 46, or alternatively supplied by the output of the voltage regulator 38. As illustrated in FIG. 2, the microphone 14 is preferably connected to the microprocessor 28 via a preamplifier 36 and a monostable oscillator 34, and the microprocessor 28 is connected to a clock 32.

Preferably, the knocking activated device 10 further comprises an output interface 42 having an input connected to the microprocessor 28 and an output for operating the electromechanical device.

According to a preferable application of the present invention, the device is for operating the locking mechanism of a vehicle door by knocking on the window glass thereof. Preferably, the knocking activated device 10 further comprises a Velcro attachment 20 for fixing the knocking activated device 10 inside the vehicle. The Velcro attachment 20 is provided on back of the knocking activated device 10 and measures about one square inch. Of course, other means for attaching the device 10 inside the vehicle may be used instead of the Velcro attachment, for example a screw and bolt arrangement. Furthermore, the electric locking mechanism should not be limited to that of a vehicle, but should be construed to cover any locking mechanism, such as the one of a the door of a house. In the above example, the device 10 is hidden under the dashboard of the vehicle so that it can be easily removed for changing its codes or data as it will be further explained.

Furthermore, the output for operating the electromechanical device is preferably embodied by a pair of cables 26 which are connected to the electric locking mechanism of the vehicle. Another cable 24 connects an ignition key of the vehicle to the microprocessor 28 for activation of the knocking activating device 10. In the case of older vehicles, the electric locking mechanism may be replaced, for example, by an electromagnetic relay.

Preferably, the programming button 16 is connected to the microprocessor 28 for setting the device 10 into a programming mode. The LED 18 which is responsive to the button 16 is provided for interacting with the user during a programming of the device 10. The LED 18 may be of a bicolor (red and green) type.

Referring back to FIG. 1, the circuit of the knocking activated device 10 is preferably housed in a small box 12 made of black colored plastic similar to remote controlled car starters. The box 12 has a size of approximately 2" high×1.25" wide×0.5" deep.

Figure 3:
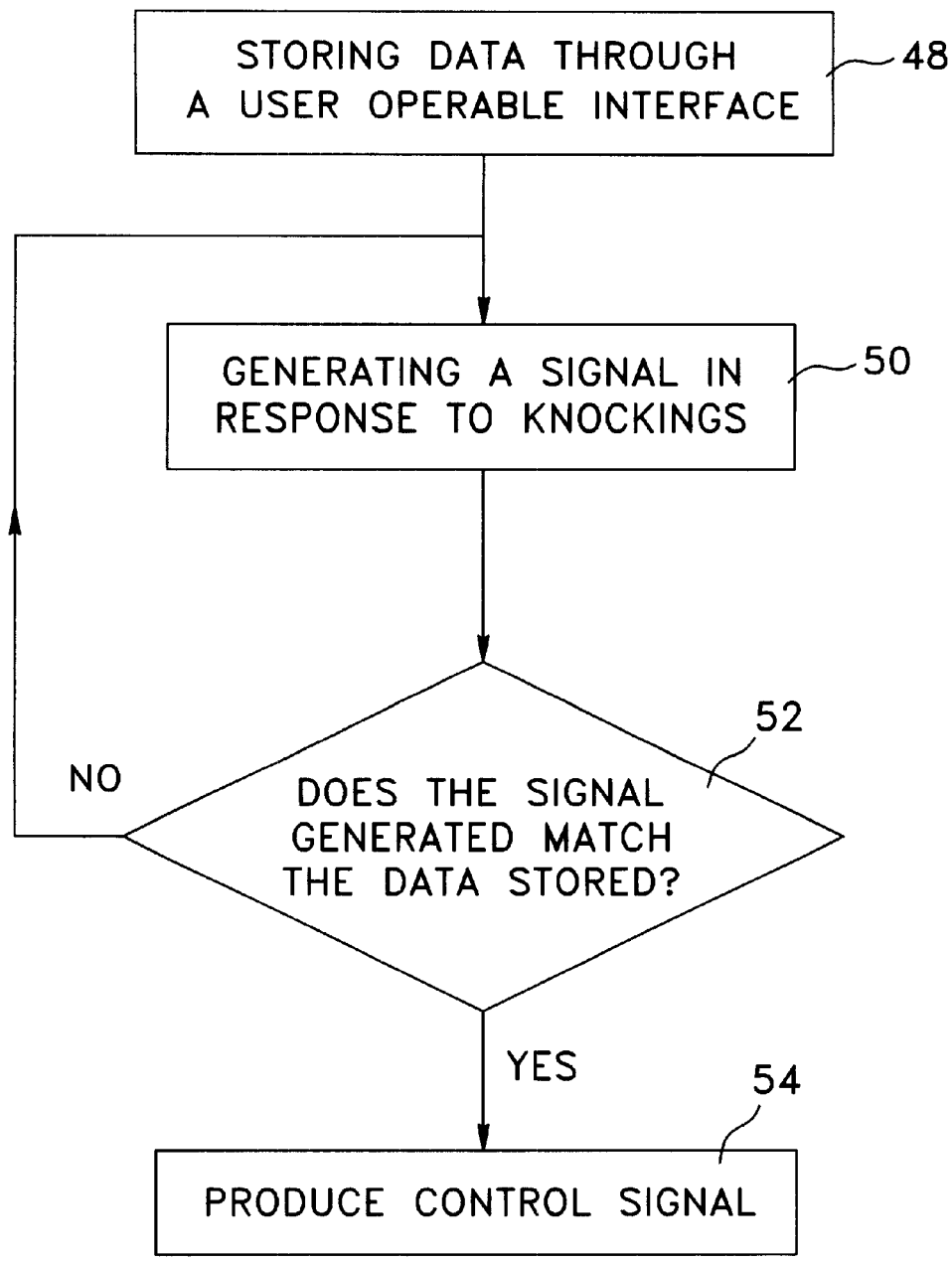
FIG. 3 shows a flow diagram of a method for operating an electromechanical device according to a preferred embodiment of the present invention.

Referring now to FIG. 3, there is shown a preferred embodiment of a method according to the present invention. Essentially, the method for operating an electromechanical device responsive to a control signal, comprises the steps of:

(a) storing data representative of a predetermined sequence of knocks through a user operable interface, step (a) being preferably performed by operation step 48;

(b) once step (a) has been performed at least one time, generating a signal in response to knockings on a solid object, step (b) being preferably performed by operation step 50; and (c) comparing the signal generated in step (b) with the data stored in step (a) to produce the control signal when the signal generated in step (b) matches the predetermined sequence of knocks, step (c) being preferably performed by operation steps 52 and 54.

Preferably, steps (a), (b), and (c) are performed by an electronic apparatus having an output connected to the electromechanical device, and step (a) comprises the steps of:

(i) activating the user operable interface; and
(ii) once step (i) has been performed, entering data through the user operable interface for storing or changing the data.

Preferably, step (a) comprises the steps of:

(i) pressing a programming button of the apparatus for a predetermined amount of time; and (ii) once step (i) has been performed, pressing and depressing the programming button a multiple number of times in a predetermined period thereby storing or changing the data.

Alternatively, steps (a), (b), and (c) may be performed by an electronic apparatus having an input connected to an ignition of a vehicle, and an output connected to the electromechanical device, and may further comprise the steps of:

(i) activating the ignition of the vehicle;

(ii) once the ignition is activated, pressing a programming button of the apparatus for a predetermined amount of time; and (iii) once steps (i) and (ii) have been performed, pressing and depressing the programming button a multiple number of times in a predetermined period thereby storing or changing the data.

Preferably, the signal generated in step (b) is processed with the following steps before said signal is used in step (c):

(i) discriminating the knockings into groups of knocks, each group of knocks being separated by a time period of one to ten seconds; and (ii) recognizing that the knocks that are separated by less than one second belong to the same group of knocks.

Furthermore, an important object of the present invention is to provide an apparatus and method which allows the unlocking of a door, or similar mechanism, without a key, numerical keyboard, remote control device or any other portable object of the sort.

Referring back again to FIGS. 1 to 3, we will shown the simplicity of operation of the invention by way of example. First, the knocking activated device 10 is mounted inside a vehicle. The microphone 14 is placed near the window of the vehicle. A user knocks on the window in a predetermined or coded manner to produce knockings. The knocking activated device 10 discriminates the knockings into groups of knocks, ensuring that each group of knocks is separated by a period of one to ten seconds. It also recognizes that the knocks that are separated by less than one second belong to the same group of knocks.

For example, if the user code is 1, 3, 5, then a user must knock one time on the window, then wait for a minimum of one second or a maximum of ten seconds before going on to the next number in the above sequence. The user then knocks three more times on the window while ensuring that the time difference between each knock in this second group is less than one second. Finally, the user waits again a minimum of one second or a maximum of ten seconds before he knocks five more times on the window. Again, the user must ensure that the time difference between each knock in this last group is less than one second. Thereafter, a control signal is sent by the knocking activated device 10 to the electric locking mechanism of the vehicle and the doors of the vehicle are unlocked.

For visualizing the user code on the knocking activated device 10, the user must insert a key in the ignition of the vehicle. This activates microprocessor 28 via cable 24. The user may then see the user code by pressing the programming button 16 once for less than three seconds: A series of flashes of the green LED 18 indicates a first number of the user code and a flash of the red LED 18 indicates that the next number of the user code will be flashed subsequently by the green LED 18. This is repeated a few times. The device 10 will then come out of this mode automatically.

For programming of a new user code, the user must insert the key in the ignition of the vehicle. The user must hold down the programming button 16 for at least three seconds and then the red LED 18 stars flashing. The user must then release the button 16 and then press it again in a similar way as if he was knocking on the window. The green LED 18 will flash with each new entry and the delay between another sequence will be signaled by the red LED 18. Thereafter, if no other entry is made within five seconds, a new user code will be automatically stored and the device 10 will automatically come out of this mode. A minimum sequence of three numbers and a maximum sequence of seven numbers between one and nine must be entered to be recognized as a valid user code. If not, the device 10 will reject such a code by flashing the red LED 18 five times, it will keep the old user code and will come out of this mode automatically.

Although the present invention has been explained hereinabove by way of a preferred embodiment thereof, it should be understood that the invention is not limited to this precise embodiment and that various changes and modifications may be effected therein without departing from the scope or spirit of the invention.

What is claimed is:

1. A knocking activated device for operating an electromechanical device responsive to a control signal, comprising:
    a vibration transducer for generating a signal in response to knockings on a solid object;
    storing means for storing data representative of a predetermined sequence of knocks;
    a user operable interface for changing the data stored in the storing means; and
    comparing means for comparing the signal generated by the vibration transducer with the data stored in the storing means to produce the control signal when the signal generated by the vibration transducer matches the predetermined sequence of knocks, the comparing means having an input connected to an ignition of a vehicle, and an output connected to the electromechanical device;
    wherein the user operable interface comprises a programming button connected to the comparing means for setting the knocking activated device into a programming mode, thereby, when the ignition is activated, the data is stored or changed in the storing means by pressing and depressing the programming button a multiple number of times in a predetermined time.

2. The knocking activated device of claim 1, wherein the comparing means comprise discriminating means for discriminating the knockings detected by the vibration transducer into groups of knocks, each group of knocks being separated by a time period of one second to ten seconds.

3. The knocking activated device of claim 2, wherein the discriminating means is adapted to recognize that knocks separated by less than one second belong to a same group of knocks.

4. The knocking activated device of claim 3, wherein the comparing means and the discriminating means are embodied by a microprocessor provided with a software, and the storing means is embodied by a memory flash.

5. The knocking activated device of claim 1, wherein the vibration transducer is a microphone.

6. The knocking activated device of claim 4, further comprising a voltage regulator having an input for connection to a power source and an output for supplying the microprocessor and the memory flash.

7. The knocking activated device of claim 4, further comprising an output interface having an input connected to the microprocessor and an output for operating the electromechanical device.

8. The knocking activated device of claim 4, wherein the programming button is connected to the microprocessor, and a LED connected to the microprocessor is responsive to the button for interacting with a user during a programming of the knocking activated device.

9. The knocking activated device of claim 1, wherein the electromechanical device is an electric locking mechanism of the vehicle and the knocking activated device further comprises a velcro attachment for fixing the knocking activated device inside the vehicle.

10. A method for operating an electromechanical device responsive to a control signal, comprising the steps of:
    (a) storing data representative of a predetermined sequence of knocks through a user operable interface;
    (b) one step (a) has been performed at least one time, generating a signal in response to knockings on a solid object; and
    (c) comparing the signal generated in step (b) with the data stored in step (a) to produce the control signal when the signal generated in step (b) matches the predetermined sequence of knocks; and
    wherein steps (a), (b), and (c) are performed by an electronic apparatus having an input connected to an ignition of a vehicle, and an output connected to the electromechanical device, the method further comprising steps of:
    (i) activating the ignition of the vehicle;
    (ii) once the ignition is activated, pressing a programming button of the apparatus for a predetermined amount of time; and
    (iii) once steps (i) and (ii) have been performed, pressing and depressing the programming button a multiple number of times in a predetermined period thereby storing or changing the data.

11. The method for operating the electromechanical device according to claim 10, wherein steps (a), (b), and (c) are performed by an electronic apparatus having an output connected to the electromechanical device, and wherein step (a) comprises the steps of:
    (i) activating the user operable interface; and
    (ii) once step (i) has been performed, entering data through the user operable interface for storing or changing the data.

12. The method for operating the electromechanical device according to claim 10, wherein steps (a), (b), and (c) are performed by an electronic apparatus having an output connected to the electromechanical device, and wherein step (a) comprises the steps of:
    (i) pressing a programming button of the apparatus for a predetermined amount of time; and
    (ii) once step (i) has been performed, pressing and depressing the programming button a multiple number of times in a predetermined period thereby storing or changing the data.

13. The method for operating the electromechanical device according to claim 10, wherein the signal generated in step (b) is processed with the following steps before said signal is used in step (c):
    (i) discriminating the knockings into groups of knocks, each group of knocks being separated by a time period of one to ten seconds; and
    (ii) recognizing that the knocks that are separated by less than one second belong to the same group of knocks.

\* \* \* \* \*